No. 660,640. Patented Oct. 30, 1900.
F., R. & O. KAMPFE.
DEVICE FOR HONING SAFETY RAZOR BLADES.
(Application filed Sept. 22, 1899.)
(No Model.) 2 Sheets—Sheet 1.

WITNESSES:
F. Stallman
F. Stern

INVENTORS
F. Kampfe
R. Kampfe
O. Kampfe
BY
Oscar F. Gunz
their ATTORNEY

No. 660,640.
F., R. & O. KAMPFE.
DEVICE FOR HONING SAFETY RAZOR BLADES.
(Application filed Sept. 22, 1899.)
(No Model.)
Patented Oct. 30, 1900.
2 Sheets—Sheet 2.
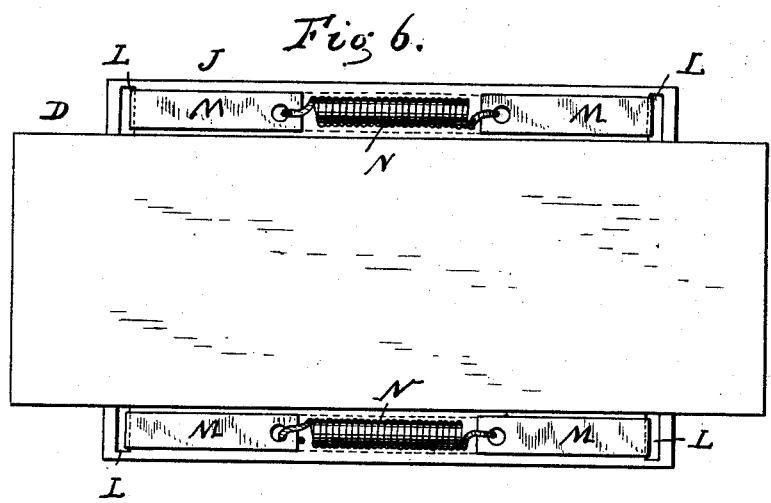
WITNESSES:
F. Stallman
H. M. Flannery
F. Kampfe INVENTORS
R. Kampfe
O. Kampfe
BY
Their ATTORNEY

UNITED STATES PATENT OFFICE.

FREDERICK KAMPFE, RICHARD KAMPFE, AND OTTO KAMPFE, OF NEW YORK, N. Y.

DEVICE FOR HONING SAFETY-RAZOR BLADES.

SPECIFICATION forming part of Letters Patent No. 660,640, dated October 30, 1900.

Application filed September 22, 1899. Serial No. 731,319. (No model.)

*To all whom it may concern:*

Be it known that we, FREDERICK KAMPFE, RICHARD KAMPFE, and OTTO KAMPFE, citizens of the United States, and residents of the city of New York, borough of Brooklyn, in the county of Kings and State of New York, have invented certain new and useful Improvements in Devices for Honing Safety-Razor Blades, of which the following is a specification.

The object of our invention is to provide a new and improved device for honing safety-razor blades rapidly and effectively.

Figure 1:
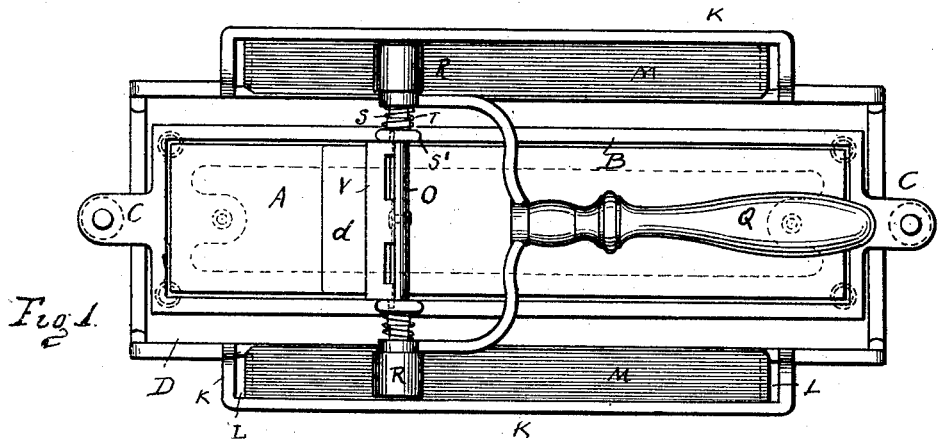
Figure 2:
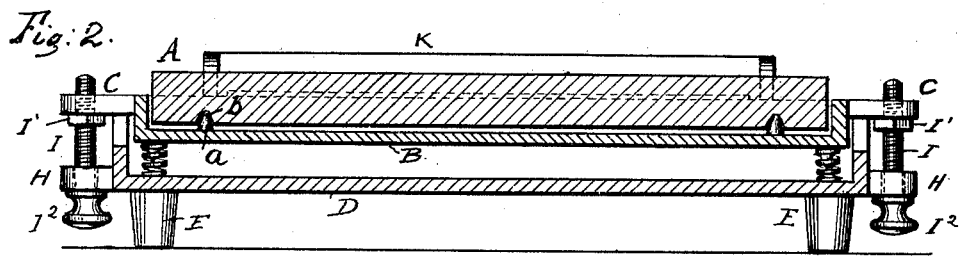
Figure 3:
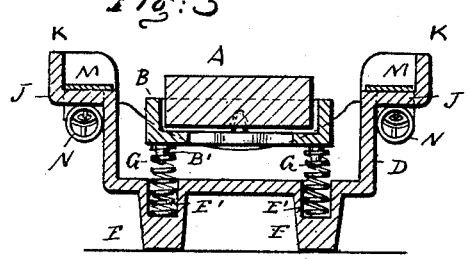
Figure 4:
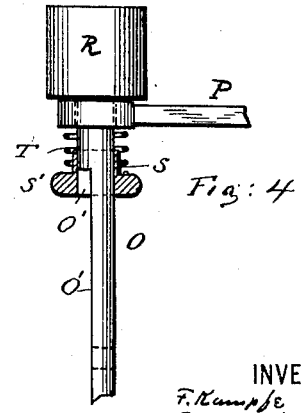
Figure 5:
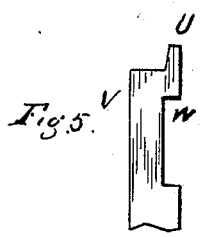

In the accompanying drawings, forming a part of this specification, and in which like letters of reference indicate like parts in all the views, Figure 1 is a plan view of our improved honing device. Fig. 2 is a vertical longitudinal sectional view of the same. Fig. 3 is a vertical transverse sectional view of the same. Fig. 4 is a detail view of part of the blade-holder, parts being in section. Fig. 5 is also a detail view of part of the blade-holder. Fig. 6 is a view of the under side of the honing device, parts being omitted.

The honing-stone A is placed in a trough-shaped receptacle B, shaped to receive it and provided on its bottom on the longitudinal central line at each end with an upwardly-projecting tapered pin $a$, which enters a corresponding recess $b$ in the under side of the stone, so as to adapt the stone to give or yield slightly in downward direction at both sides. The receptacle B is provided at its upper edge at each end with a laterally-extending lug C, having a threaded aperture. The receptacle B is placed into a base D, having legs E on the bottom and recessed ends over which the lugs C of the receptacle B can pass.
The receptacle B is provided on its under side at each corner with a teat B', which rests in the upper end of a helical spring G, of which there are four, the lower ends of said springs resting in recesses E' in the upper parts of the four legs E, so that the receptacle is supported by said four springs G. The base D is provided at each end with a laterally-extending wing H, having an aperture through which a screw I is passed, the upper end of the screw being screwed into the threaded aperture of the lug C above it, a lock-nut I' being screwed on the screw I directly below the lug C. The screw-heads $I^2$ rest against the under sides of the wings H. The base D is provided with wings J, projecting outwardly laterally from the upper edges of the side walls, and these wings are provided with upwardly-extending flanges K along the outer edges and ends and with a transverse slot L at each end. Leather or rubber straps M rest on the wings J and form friction-tracks, and their ends are passed through the slots L and attached to the ends of helical springs N on the under sides of the wings, whereby said straps are held taut on the wings J.

The blade-holder consists of a shaft O, mounted to turn in the ends of a fork P, having a handle Q, the ends of the shaft extending beyond the shanks of the fork, and on each such projecting end a hard-rubber roller R is fixed. The length of this shaft, including the rollers R, is slightly less than the distance between the flanges K of the wings J. Adjacent to the inner side of each prong of the fork P a sleeve S is mounted to slide on the shaft O and is pressed in the direction from the inner side of said prong by a helical spring T, surrounding said sleeve and resting against said prong and a raised annular rim S' on said sleeve. Between said sleeves S half of the diameter of the said shaft O is cut away, as at O'. A U-shaped longitudinal socket V is swiveled at its center to said flat portion of the shaft, said socket being shaped to receive the back of the safety-razor blade $d$. The socket V has slots W to increase its spring tension and is provided at each end with a tongue U. The blade $d$ is pushed into the socket V while the same is at right angles to the shaft O, and then the socket, with the blade, is swung in line with the shaft O and the sleeves S pushed toward the prongs of the fork P, and when the tongues U are in line with the shaft O said sleeves are released and by their springs T are pushed over the end tongues U, and thus hold the socket in line with the shaft S. The holder is then placed upon the stone A in such a manner that the rollers R rest upon the straps M, the stone A yielding more or less. The holder is then moved over the length of the stone, so that the blade d moves over the stone edge foremost. When the direction of movement of the holder is reversed, the friction between the rollers R and straps M automatically turns the shaft O axially, and the blade is thus automatically reversed, so that it again moves edge foremost over the stone A on the return stroke, and so on. As the stone is not held rigidly, it can always adapt itself to the blade, and by means of the screws I the stone can easily be adjusted to be at the proper elevation in relation to the straps M.

Having described our invention, what we claim as new, and desire to secure by Letters Patent, is—

1. In a device for honing safety-razor blades, the combination with a base for receiving a honing-stone, of friction-tracks on the sides of said base, a reversible blade-holder and friction-rollers fixed on the ends of said reversible blade-holder, mounted to run on said tracks, substantially as set forth.

2. In a device for honing safety-razor blades, the combination with a base for receiving a honing-stone, of side wings on said base, friction-straps held on said wings, a reversible blade-holder and friction-rollers on the ends of said reversible blade-holder, to run on the surfaces of the straps, substantially as set forth.

3. In a honing device, the combination with a base for receiving a stone, of side wings on said base and having slots at the ends, straps resting on the wings and having their ends passed through said slots and means attached to the ends of the straps on the under sides of said wings for holding the straps taut, substantially as herein shown and described.

4. In a honing device, the combination with a base having side friction-tracks, of a stone-receptacle in said base and means for adjusting said receptacle in relation to the friction-tracks, substantially as herein shown and described.

5. In a honing device, the combination with a base having side friction-tracks, of a stone-receptacle in said base, lugs on the ends of the receptacle wings on the ends of the base, and screws in said lugs and wings, substantially as herein shown and described.

6. In a honing device, a blade-holder composed of a U-shaped frame, a shaft mounted in the ends of the prongs, friction-rollers on said shaft, a blade-holding socket and means for holding the socket on said shaft in line with the same, substantially as herein shown and described.

7. In a honing device, a blade-holder composed of a U-shaped frame, a shaft mounted in the ends of the prongs, friction-rollers on said shaft, a blade-holding socket swiveled on said shaft and means for holding it on the shaft in line with the same, substantially as herein shown and described.

8. In a honing device, a blade-holder composed of a U-shaped frame, a shaft mounted in the ends of the prongs, friction-rollers on said shaft, a blade-holding socket having end tongues, a sliding sleeve at each end of the shaft and a spring for pressing each sleeve from the adjacent prong of the fork, substantially as herein shown and described.

Signed at New York, in the county of New York and State of New York, this 18th day of September, A. D. 1899.

FREDERICK KAMPFE.
RICHARD KAMPFE.
OTTO KAMPFE.

Witnesses:
N. M. FLANNERY,
O. F. GUNZ.